United States Patent
You et al.

(10) Patent No.: US 9,453,957 B2
(45) Date of Patent: Sep. 27, 2016

(54) BOTTOM CHASSIS, METHOD OF MANUFACTURING THE SAME, AND DISPLAY APPARATUS INCLUDING THE SAME

(71) Applicant: Samsung Display Co., Ltd., Yongin, Gyeonggi-Do (KR)

(72) Inventors: Junwoo You, Seongnam-si (KR); Seung-Hwa Ha, Osan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 54 days.

(21) Appl. No.: 14/106,779

(22) Filed: Dec. 15, 2013

(65) Prior Publication Data
US 2015/0029435 A1    Jan. 29, 2015

(30) Foreign Application Priority Data
Jul. 29, 2013 (KR) .......................... 10-2013-0089562

(51) Int. Cl.
*G02F 1/1333* (2006.01)
*F21V 8/00* (2006.01)

(52) U.S. Cl.
CPC ............ *G02B 6/0055* (2013.01); *G02B 6/0036* (2013.01); *G02B 6/0065* (2013.01); *G02B 6/002* (2013.01); *G02B 6/0028* (2013.01); *Y10T 29/49982* (2015.01)

(58) Field of Classification Search
CPC ................... G02F 1/133605; G02F 1/133608; G02B 6/0055; G02B 6/002; G02B 6/0028; G02B 6/0036; G02B 6/0065; Y10T 29/49982
USPC ........ 362/624, 628, 632–633; 349/58, 61, 65
See application file for complete search history.

(56) References Cited

U.S. PATENT DOCUMENTS

| | | | |
|---|---|---|---|
| 7,832,916 B2 | 11/2010 | Kawato et al. | |
| 2004/0141304 A1* | 7/2004 | Nagakubo | G02B 6/0038 362/612 |
| 2006/0044780 A1* | 3/2006 | Kim | G02F 1/133604 362/23.18 |
| 2007/0171676 A1* | 7/2007 | Chang | G02B 6/0046 362/613 |
| 2009/0033832 A1* | 2/2009 | Pai | 349/65 |
| 2009/0268122 A1* | 10/2009 | Takahashi | G02B 6/0088 349/58 |
| 2010/0033953 A1* | 2/2010 | Tien | G02F 1/133603 362/97.1 |
| 2010/0302218 A1* | 12/2010 | Bita et al. | 345/204 |
| 2011/0255025 A1* | 10/2011 | Lee et al. | 349/58 |
| 2012/0140443 A1 | 6/2012 | Kim et al. | |
| 2012/0268691 A1* | 10/2012 | Kuo et al. | 349/65 |
| 2013/0050987 A1 | 2/2013 | Yang et al. | |

FOREIGN PATENT DOCUMENTS

| | | |
|---|---|---|
| JP | 2001-236022 A | 8/2001 |
| KR | 1020000055000 A | 9/2000 |

(Continued)

*Primary Examiner* — Nathanael R Briggs
(74) *Attorney, Agent, or Firm* — Cantor Colburn LLP

(57) ABSTRACT

A bottom chassis includes a base chassis which accommodates a light source part emitting a light, a reflective film disposed on a bottom plate of the base chassis and including a reflective material to reflect the light, a cladding film disposed on the reflective film, and a light guide film disposed on the cladding film, receiving the light from the light source part through a first surface thereof, and guiding the received light to exit through a second surface thereof as a plane light, where the cladding film has a refractive index smaller than a refractive index of the light guide film.

22 Claims, 21 Drawing Sheets

(56) References Cited

FOREIGN PATENT DOCUMENTS

| KR | 1020040005215 A | 1/2004 |
| KR | 1020100048042 A | 5/2010 |
| KR | 1020130011706 A | 1/2013 |

* cited by examiner

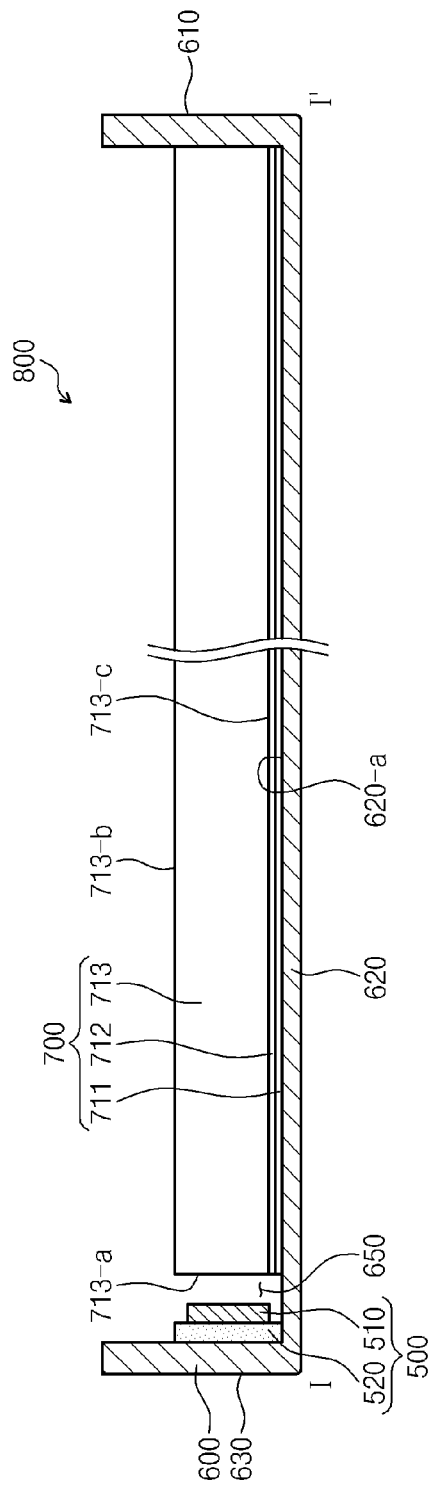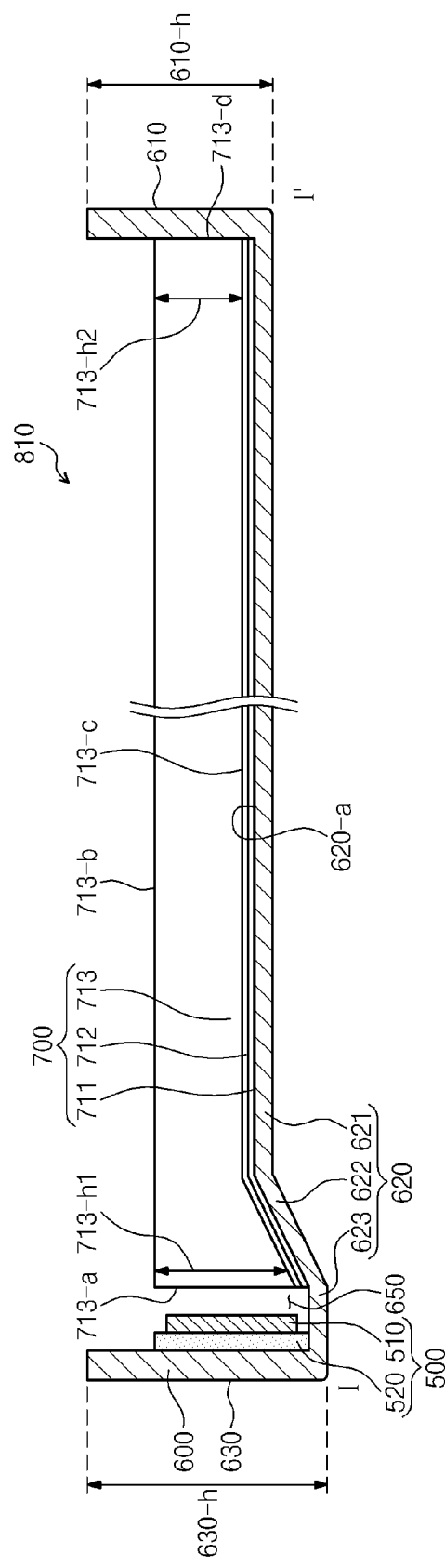

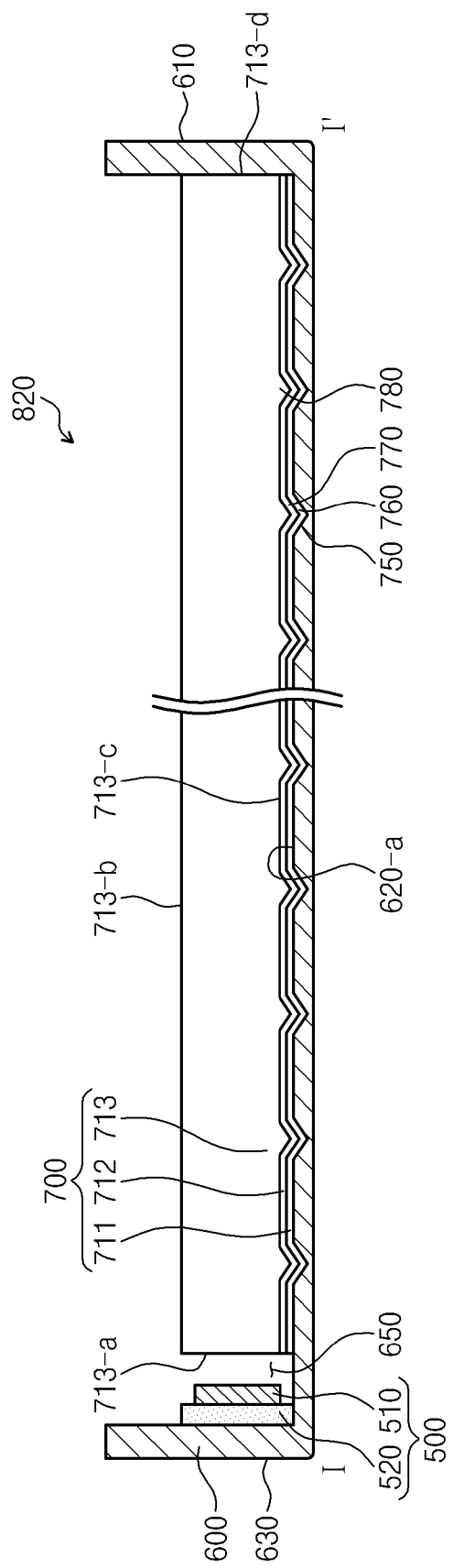

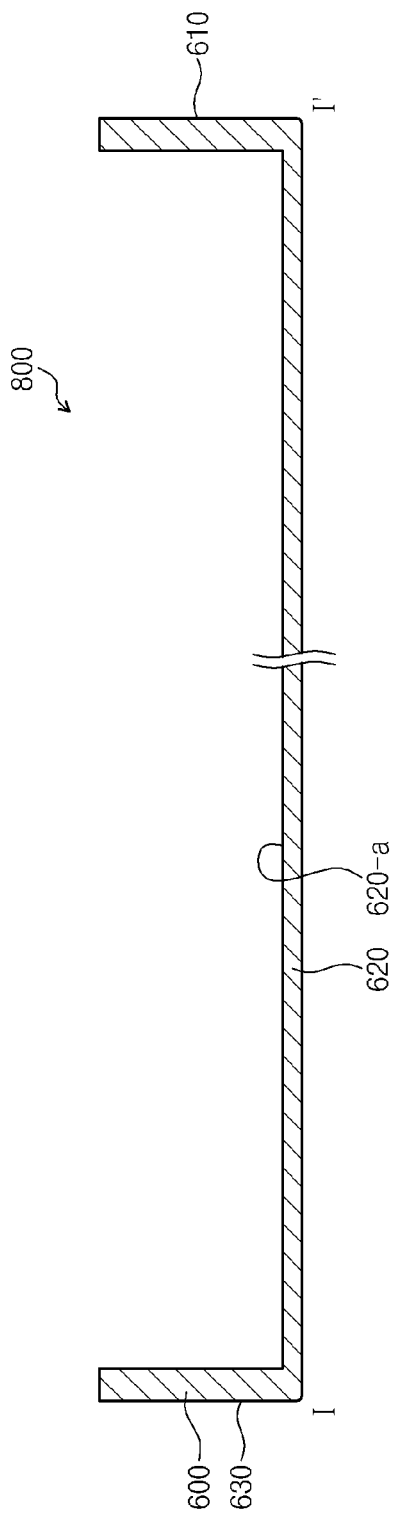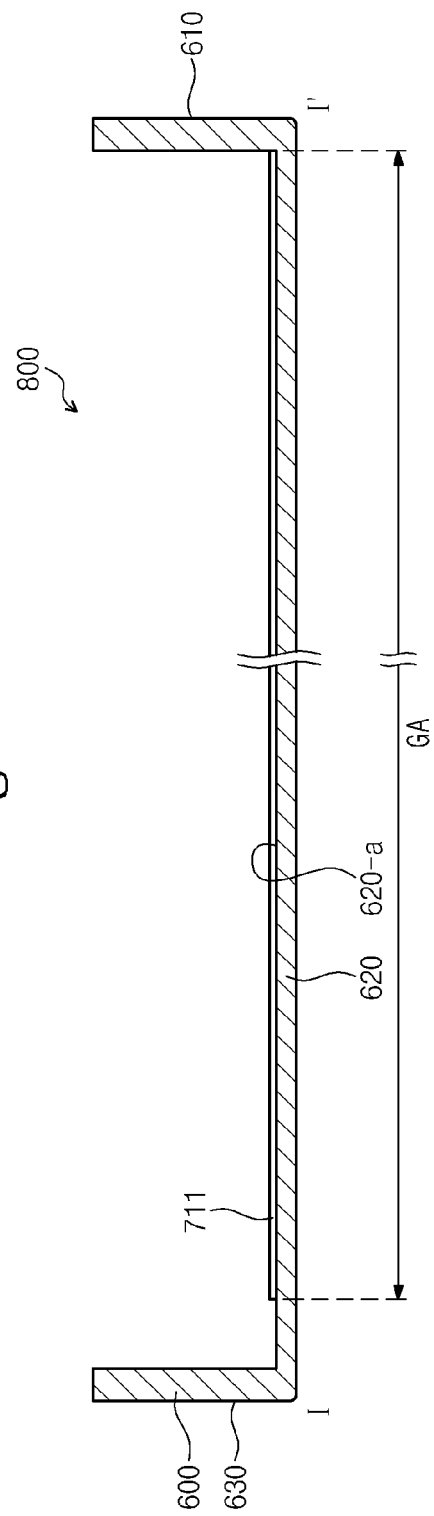

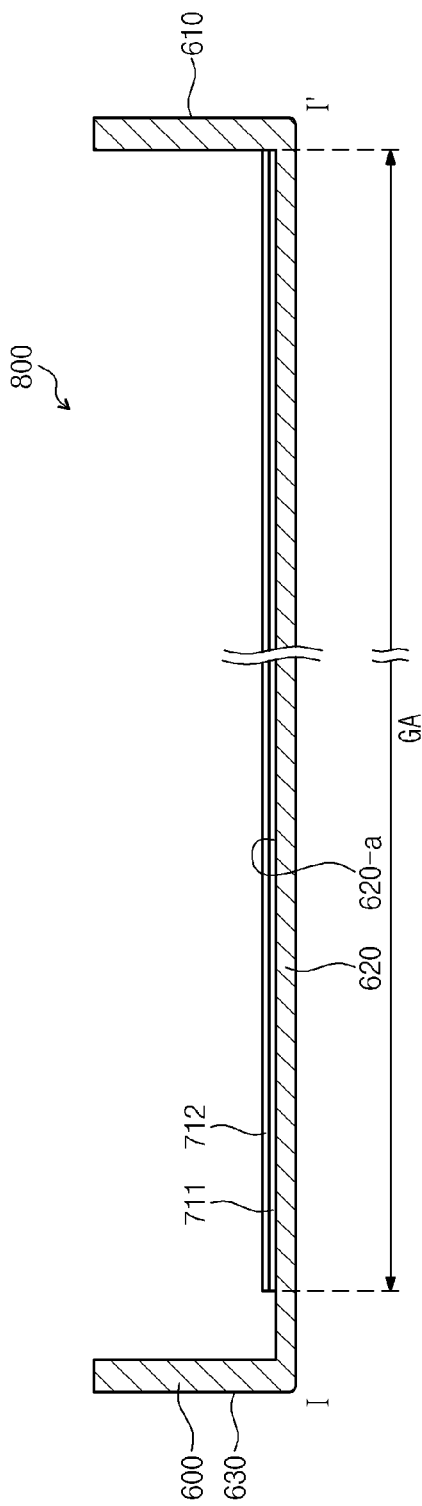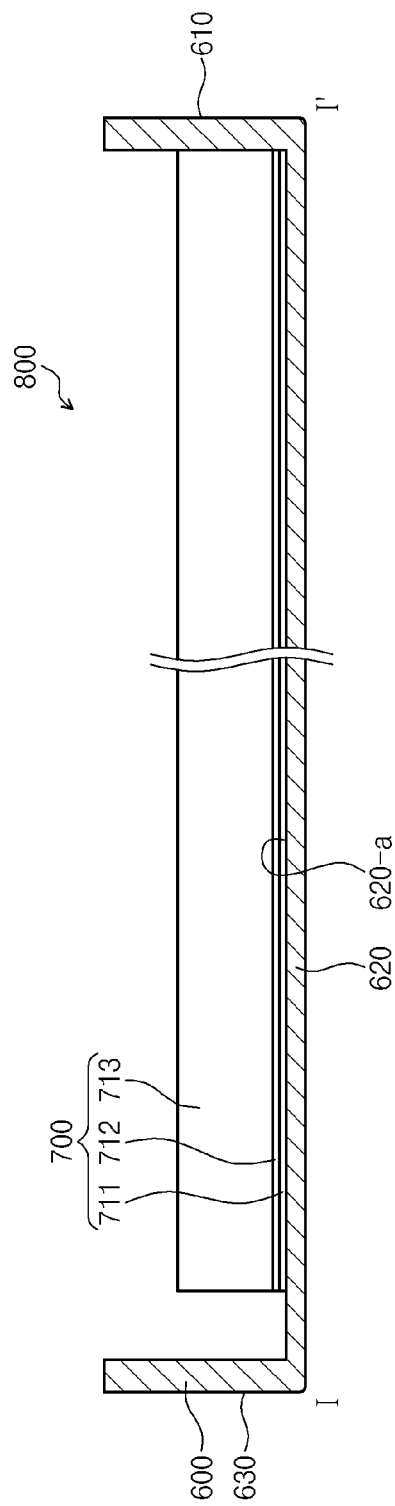

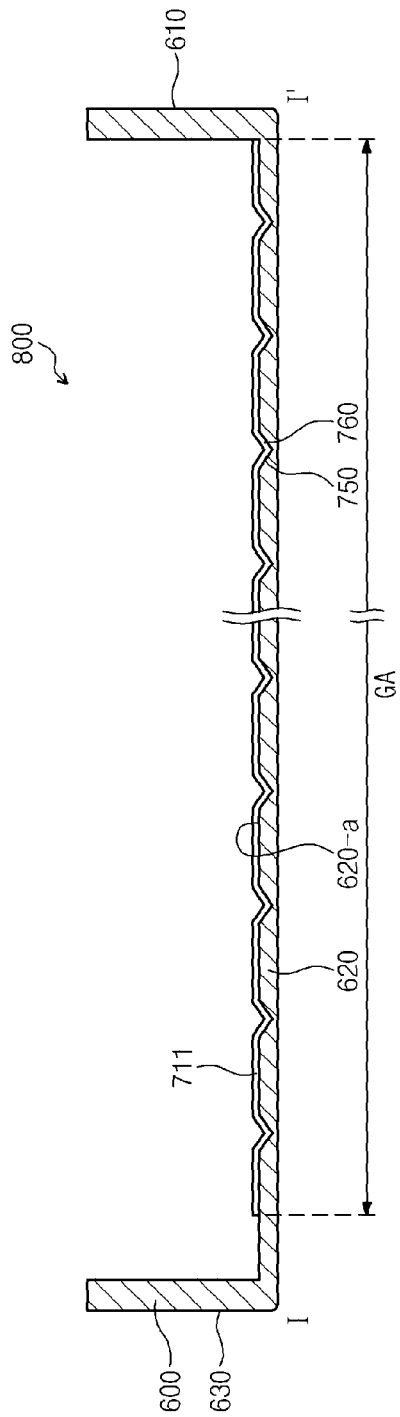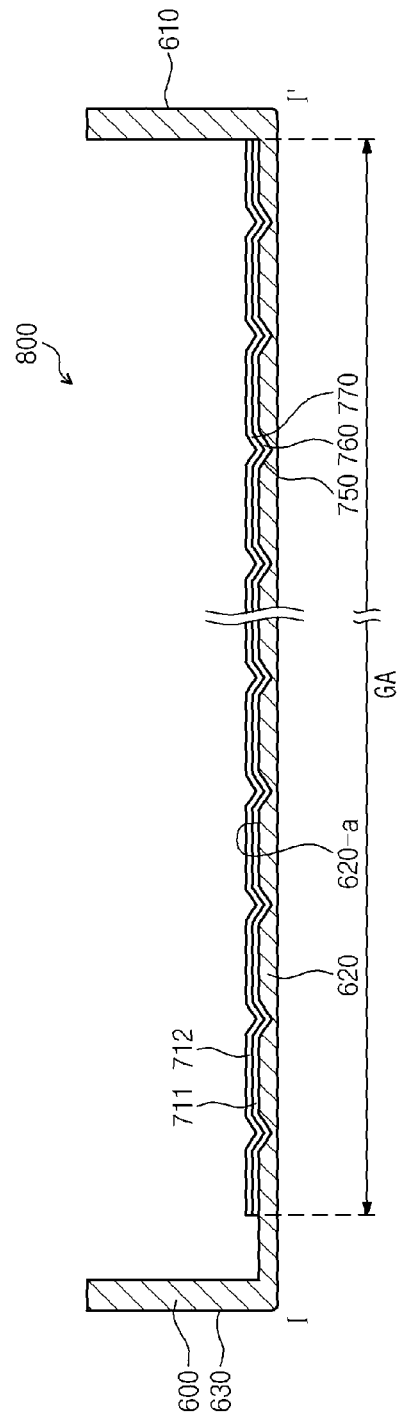

BOTTOM CHASSIS, METHOD OF MANUFACTURING THE SAME, AND DISPLAY APPARATUS INCLUDING THE SAME

This application claims priority to Korean Patent Application No. 10-2013-0089562, filed on Jul. 29, 2013, and all the benefits accruing therefrom under 35 U.S.C. §119, the contents of which are hereby incorporated by reference in its entirety.

BACKGROUND

1. Field

The invention relates to a bottom chassis, a method of manufacturing the same, and a display apparatus having the same. More particularly, the invention relates to a bottom chassis having a reduced thickness, a method of manufacturing the bottom chassis, and a display apparatus having the bottom chassis.

2. Description of the Related Art

A liquid crystal display ("LCD") includes a display panel that controls an arrangement of liquid crystal molecules in a liquid crystal layer to display an image and a backlight unit that provides a light to the display panel. The backlight unit includes a light source to emit the light, a light guide plate to guide the light provided from the light source to the display panel, and a diffusion sheet to diffuse the light exiting from the light guide plate. The light incident into the light guide plate is totally reflected at a boundary surface of the light guide plate and guided along the light guide plate. A bottom chassis accommodates the light source and a reflective sheet and protects the LCD from external impacts.

The light guide plate is manufactured by casting, extruding or injecting a plastic material with high light transmittance and high weather resistance, and placed on the bottom chassis.

SUMMARY

There is limitation to reduce a thickness of a light guide plate due to inherent properties in a manufacturing process for the light guide plate. In addition, when the light guide plate is separately manufactured and then placed on a bottom chassis, a thickness of the display apparatus is difficult to reduce.

The invention provides a bottom chassis having a reduced thickness.

The invention provides a method of manufacturing the bottom chassis.

The invention provides a display apparatus having the bottom chassis.

Exemplary embodiments of the invention provide a bottom chassis including a base chassis which accommodates a light source part which emits a light, a reflective film which is disposed on a bottom plate of the base chassis and includes a reflective material to reflect the light, a cladding film disposed on the reflective film, and a light guide film which is disposed on the cladding film, receives the light from the light source part through a first surface thereof, and guides the received light to exit through a second surface thereof as a plane light. The cladding film has a refractive index smaller than a refractive index of the light guide film.

In an exemplary embodiment, the light guide film may further include a light guide pattern disposed on a third surface facing the second surface to guide the received light to the second surface, and the first surface connects the second surface and the third surface.

In an exemplary embodiment, the bottom plate of the base chassis may include a base pattern having a concavo-convex shape and the light guide pattern has a shape corresponding to the base pattern.

In an exemplary embodiment, the reflective film and the cladding film may be sequentially stacked on the bottom plate, and each of the reflective film and the cladding films having a concavo-convex shape corresponding to the base pattern on the bottom plate has a uniform thickness.

In an exemplary embodiment, the light guide pattern may include a pattern recess recessed from the third surface to the second surface and the pattern recess has a cone shape, an elliptical cone shape, a triangular pyramid shape, a quadrangular pyramid shape, a hexagonal pyramid shape, a cylinder shape, an elliptic cylinder shape, a triangular prism shape, a square column shape, or a hexagonal column shape.

In an exemplary embodiment, the light guide pattern may include a pattern protrusion protruded from the third surface to the cladding film and the pattern protrusion has a cone shape, an elliptical cone shape, a triangular pyramid shape, a quadrangular pyramid shape, a hexagonal pyramid shape, a cylinder shape, an elliptic cylinder shape, a triangular prism shape, a square column shape, or a hexagonal column shape.

In an exemplary embodiment, the light guide film may have a thickness of about 50 micrometers to about 300 micrometers.

In an exemplary embodiment, the cladding film may have a thickness of about 10 micrometers to about 100 micrometers.

In an exemplary embodiment, the cladding film may include silicon.

In an exemplary embodiment, the bottom chassis may further include a first sidewall and a second sidewall. The bottom plate includes a first horizontal bottom plate, a second horizontal bottom plate, and an inclination bottom plate disposed between the first and second horizontal bottom plates, the inclination bottom plate is extended from an end of the first horizontal bottom plate to an end of the second horizontal bottom plate and inclined to a rear surface of the first horizontal bottom plate, the first sidewall is extended from the other end of the first horizontal bottom plate, the second sidewall extended from the other end of the second horizontal bottom plate to face the first sidewall, and the light source part is disposed on the second horizontal bottom plate.

In an exemplary embodiment, the reflective film and the cladding film may be disposed on first and second horizontal bottom plates and the inclination bottom plate and have a uniform thickness, respectively, and a width of the first surface of the light guide film in a direction vertical to the bottom plate is greater than a width of a fourth surface facing the first surface.

Exemplary embodiments of the invention provide a method of manufacturing a bottom chassis including forming a base chassis, providing a reflective material on a bottom surface of the base chassis to form a reflective film, providing a cladding material on an upper surface of the reflective film to form a cladding film, and providing a guiding material on an upper surface of the cladding film to form a light guide film. The cladding material has a refractive index smaller than a refractive index of the guiding material.

In an exemplary embodiment, the forming the base chassis may include forming a base pattern having a concavo-convex shape on the base chassis, the forming the reflective film includes providing the reflective material on the base pattern at a uniform thickness such that the reflective film has a concavo-convex shape corresponding to the base pattern, and the forming the cladding film includes providing the cladding material on the concavo-convex shape of the reflective film at a uniform thickness such that the cladding film has a concavo-convex shape corresponding to the concavo-convex shape of the reflective film, and the forming the light guide film includes forming a light guide pattern corresponding to the concavo-convex shape on a surface thereof that contacts with the cladding film.

In an exemplary embodiment, the forming the base pattern may include aligning a laser unit along the base pattern and irradiating a laser beam on an upper surface of the base chassis using the laser unit to form the base pattern on the bottom surface of the base chassis.

In an exemplary embodiment, the forming the base pattern may include aligning an extrusion mold having a reverse shape to the base pattern on the base chassis, applying a pressure onto the extrusion mold to form the base pattern on the bottom surface of the base chassis, separating the extrusion mold from the base chassis.

In an exemplary embodiment, the forming the base pattern may include interposing the base chassis between a mold roll having a reverse shape to the base pattern and a base roll and rotating the mold roll and the base roll to form the base pattern on the bottom surface of the base chassis.

In an exemplary embodiment, the light guide film may be provided by injection-molding the guiding material using an injection mold.

Exemplary embodiments of the invention provide a display apparatus includes a light source part that emits a light, a bottom chassis that receives the light from the light source part, converts the light to a plane light, and includes a base chassis that accommodates the light source part, a reflective film disposed on a bottom plate of the base chassis and including a reflective material to reflect the light, a cladding film disposed on the reflective film, and a light guide film disposed on the cladding film, receiving the light from the light guide part through a first surface thereof, and guiding the received light to allow the light exits through a second surface thereof, and a display panel that receives the plane light from the bottom chassis to display an image. The cladding film has a refractive index smaller than a refractive index of the light guide film.

In an exemplary embodiment, the light guide film may further include a light guide pattern disposed on a third surface facing the second surface to guide the received light to the second surface, and the first surface connects the second surface and the third surface.

In an exemplary embodiment, the bottom plate of the base chassis may include a base pattern having a concavo-convex shape and the light guide pattern has a shape corresponding to the base pattern.

According to the above, the bottom chassis includes the light guide film, and thus the display apparatus does not require a separate light guide plate. Thus, the display apparatus has a simplified structure and is slimmed down.

BRIEF DESCRIPTION OF THE DRAWINGS

The above and other advantages of the invention will become readily apparent by reference to the following detailed description when considered in conjunction with the accompanying drawings, in which:

FIG. 2 is a cross-sectional view taken along line I-I' of FIG. 1;

FIG. 3 is a cross-sectional view showing another exemplary embodiment of a bottom chassis according to the invention;

FIG. 4 is a cross-sectional view showing another exemplary embodiment of a bottom chassis according to the invention;

FIGS. 9A to 9D are views showing an exemplary embodiment of a method of manufacturing a bottom chassis according to the invention;

FIGS. 11A to 11E are views showing another exemplary embodiment of a method of manufacturing a bottom chassis according to the invention;

DETAILED DESCRIPTION

Figure 1:
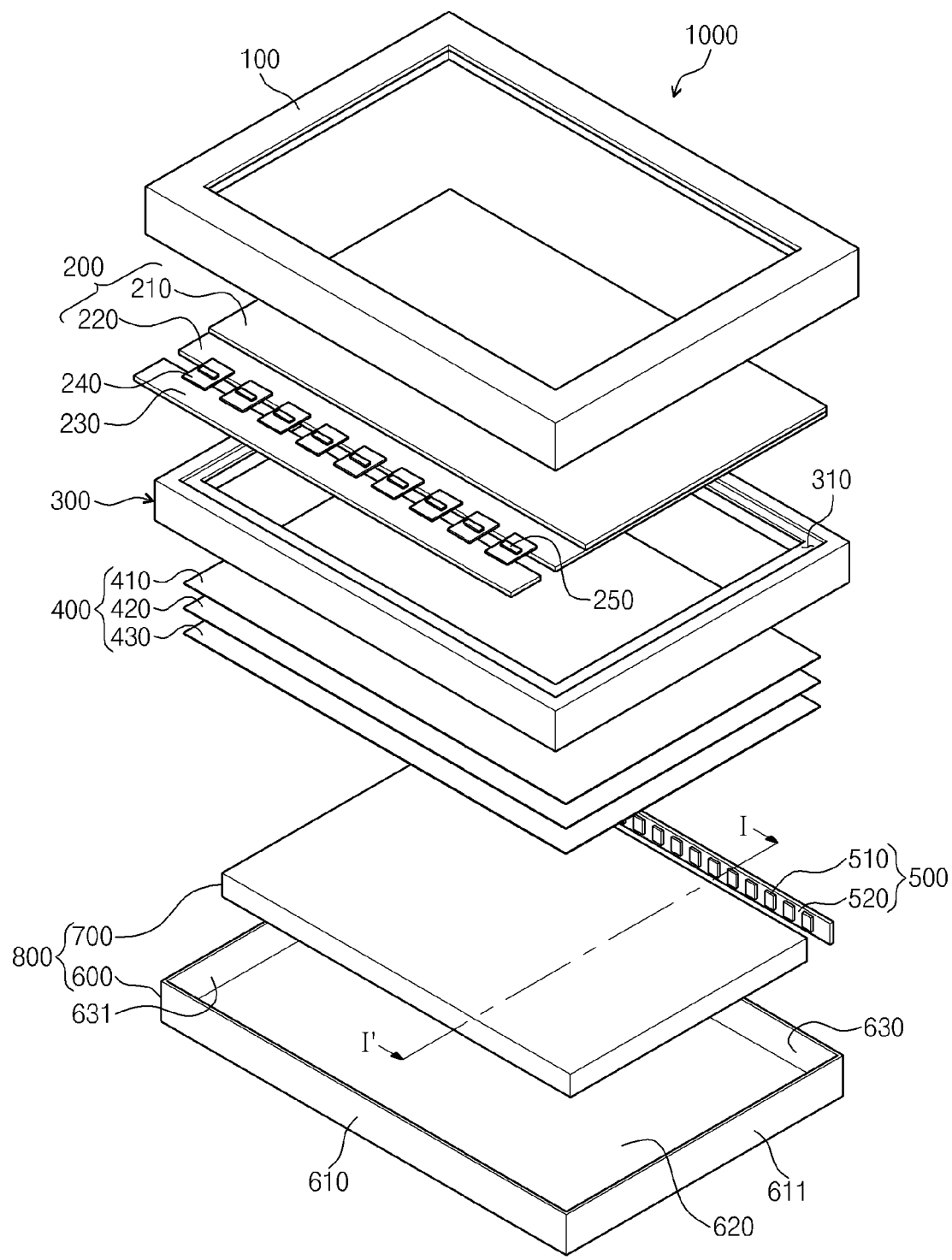
FIG. 1 is an exploded perspective view showing an exemplary embodiment of a display apparatus according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

FIG. 1 is an exploded perspective view showing a display apparatus according to an exemplary embodiment of the invention.

Referring to FIG. 1, a liquid crystal display ("LCD") 1000 includes a top chassis 100, a display panel 200, a mold frame 300, an optical member 400, a light source part 500, and a bottom chassis 800.

The display panel 200 includes an array substrate 220, an opposite substrate 210 facing the array substrate 220 while being coupled to the array substrate 220, and a liquid crystal layer (not shown) interposed between the array substrate 220 and the opposite substrate 210.

The array substrate 220 may be, but not limited to, a thin film transistor substrate on which thin film transistors that serve as a switching device are arranged in a matrix form. Each thin film transistor includes a source electrode connected to a data line, a gate electrode connected to a gate line, and a drain electrode connected to a pixel electrode including a transparent conductive material.

The opposite substrate 210 includes an RGB color filter to display colors, a black matrix, and a common electrode including a transparent conductive material.

The LCD 1000 includes a printed circuit board ("PCB") 230 including a timing controller to apply a data driving signal and a gate driving signal and a driving circuit film 240 to connect the PCB 230 to the display panel 200.

In an exemplary embodiment, the driving circuit film 240 may be a tape carrier package ("TCP") on which a driving chip is mounted or a chip on film ("COF") package.

The driving chip includes a data driver that applies a data signal to the display panel 200 in response to the data driving signal. In addition, a gate driver that applies a gate signal to the display panel 200 in response to the gate driving signal may be disposed (e.g., built) in the display panel 200 through a thin film process.

The mold frame 300 is disposed between the optical member 400 and the display panel 200. The mold frame 300 is coupled to the bottom chassis 800 to fix the optical member 400 to the bottom chassis 800 and effectively prevents the optical member 400 from moving.

In addition, the mold frame 300 supports the display panel 200. In detail, the mold frame 300 further includes a panel guide part 310 to guide the display panel 200 placed on the panel guide part 310.

The top chassis 100 faces the mold frame 300 while being coupled to the mold frame 300, and the top chassis 100 fixes the display panel 200 to the mold frame 300. The top chassis 100 covers an edge of the display panel 200 while fixing the display panel 200 to the mold frame 300. Accordingly, the top chassis 100 effectively prevents the display panel 200 from being damaged due to external impacts and from being separated from the mold frame 300.

The optical member 400 includes optical sheets 410, 420, and 430.

The optical sheets 410, 420, and 430 includes one diffusion sheet 430 to diffuse the light provided from the bottom chassis 800 and two prism sheets 410 and 420 to collect the diffused light, thereby improving a brightness characteristic of the light provided from the bottom chassis 800.

The diffusion sheet 430 diffuses the light provided from the bottom chassis 800. In an exemplary embodiment, the diffusion sheet 430 includes a transparent material, e.g., polyethylene terephthalate ("PET"). However, the invention is not limited thereto, and the diffusion sheet 430 may include various other types of transparent materials.

The prism sheets 410 and 420 are disposed on the diffusion sheet 430 and collect the light diffused by the diffusion sheet, thereby improve a front brightness. Each of the prism sheets 410 and 420 includes a prism pattern (not shown) having a prism shape. In an exemplary embodiment, one of the prism sheets 410 and 420 includes the prism pattern extended in a first direction and the other of the prism sheet 410 and 420 includes the prism pattern extended in a second direction substantially perpendicular to the first direction.

The light source part 500 is accommodated in the bottom chassis 800. The light source part 500 provides the light to the bottom chassis 800. The light source part 500 includes a circuit board 520 and a plurality of light sources 510 disposed (e.g., mounted) on the circuit board 520. In an exemplary embodiment each of the light sources 510 may include a light emitting diode ("LED") that emits a white light. However, the invention is not limited thereto, and the diffusion sheet 430 may include various other types of light sources emitting various other colors.

FIG. 2 is a cross-sectional view taken along line I-I' of FIG. 1.

Referring to FIG. 2, the bottom chassis 800 includes a base chassis 600 and a light converting part 700. The light converting part 700 includes a reflective film 711, a cladding film 712 and a light guide film 713.

The base chassis 600 includes a bottom plate 620 having a rectangular shape, and first, second, third and fourth sidewalls 610, 630, 611, and 631 extended from the bottom plate 620. The first and second sidewalls 610 and 630 face each other and the third and fourth sidewalls 611 and 631 face each other. In an exemplary embodiment, the base chassis 600 may include an aluminum-based metal, for example, to easily discharge heat generated from the light source part 500. However, the invention is not limited thereto, and the base chassis 600 may include various other types of materials.

The reflective film 711 is disposed on a bottom surface 620-*a* of the bottom plate 620 of the base chassis 600, the cladding film 712 is disposed on the reflective film 711, and the light guide film 713 is disposed on the cladding film 712. In an exemplary embodiment, the reflective film 711 and the cladding film 712 are provided by a coating method, and the light guide film 713 is provided by coating a guiding material on the cladding film 712. A manufacturing process of the bottom chassis 600 will be described in detail later.

The bottom chassis 600 provides a light source receiving part 650 defined by a side surface, a bottom surface of the light converting part 700 and the second sidewall 630, and the light source part 500 is accommodated in the light source receiving part 650. The light source part 500 is disposed (e.g., accommodated) in the light source receiving part 650 and attached to the second sidewall 630 to allow a light exit surface thereof to face the light guide film 713.

The light guide film 713 receives the light from the light source part 500 and guides the light to the optical member 400. The light guide film 713 includes first, second, and third surfaces 713-*a*, 713-*b*, and 7143-*c*. The first surface 713-*a* faces the light exit surface of the light source part 500 and receives the light from the light source part 500. The second surface 713-*b* faces the optical member 400 and the light incident to the first surface 713-*a* exits through the second surface 713-*b* as a plane light. The third surface 713-*c* is substantially parallel to the second surface 713-*b*, makes contact with an upper surface of the cladding film 712, and guides the light incident through the first surface 713-*a* to the second surface 713-*b*. In an exemplary embodiment, the first surface 713-*a* may be one of side surfaces used to connect the second surface 713-*b* and the third surface 713-*c*. In an exemplary embodiment, the light guide film 713 includes a resin with high light transmittance and high weather resistance, e.g., polymethylmethacrylate ("PMMA").

The cladding film 712 totally reflects the light traveling to the cladding film 712 in the light guide film 713 to the light guide film 713. In an exemplary embodiment, the cladding film 712 includes a material with a refractive index lower than that of the light guide film 713, preferably the cladding film 712 has the refractive index approximate to a refractive index of air, e.g., about 0. In an exemplary embodiment, when the light guide film 713 includes PMMA having a refractive index of about 1.49, the cladding film 712 includes silicon having a refractive index of about 1.2. Thus, when the light incident into the light guide film 713 and reaching to an interface, i.e., the third surface 713-*c*, between the light guide film 713 and the cladding film 712 has an angle greater than a critical angle, the light is totally reflected by the third surface 713-*c* to travel back to the inside of the light guide film 713. In this case, the critical angle is defined by an angle between a normal line of the third surface 713-*c* and a direction in which the incident light travels. The light incident into the light guide film 713 from the light source part 500 may be totally reflected by the cladding film 712 in the light guide film 713.

The reflective film 711 reflects the light leaked from the cladding film 712 and not totally reflected by the cladding film 712 to allow the leaked light to travel back to the cladding film 712. In an exemplary embodiment, the reflective film 711 includes a resin material having high reflectance, e.g., polyethylene terephthalate, polycarbonate ("PC"), etc. Therefore, the light leaked from the cladding film 712 is reflected by the reflective film 711 and travels back to the light guide film 713. The reflective film 711 regularly or irregularly reflects the light incident thereto to the light guide film 713.

As described above, since the light guide film 713 is directly disposed on the base chassis 600 in a film form, a total thickness of the display apparatus may be effectively reduced. In addition, the display apparatus may be simply assembled, and thus defects occurring when the display apparatus is assembled may be effectively reduced and the time required to assemble the display apparatus may be shortened.

FIG. 3 is a cross-sectional view showing a bottom chassis according to another exemplary embodiment of the invention.

Referring to FIG. 3, a bottom chassis 810 includes a base chassis 600, a reflective film 711, a cladding film 712, and a light guide film 713.

The base chassis 600 includes a first sidewall 610, a second sidewall 630, and a bottom plate 620. The bottom plate 620 includes a first horizontal bottom plate 621, a second horizontal bottom plate 623, and an inclination bottom plate 622. In detail, the first sidewall 610 is extended from one end of the first horizontal bottom plate 621 and the second sidewall 630 is extended from one end of the second horizontal bottom plate 623. The inclination bottom plate 622 is disposed between the first and second horizontal bottom plates 621 and 623 to connect the first and second horizontal bottom plates 621 and 623. In particular, the inclination bottom plate 622 is inclined downward from the first horizontal bottom plate 621 and extended to the second horizontal bottom plate 623.

The light source part 500 is disposed in the light source receiving part 650 and attached to the second sidewall 630 to allow the light exit surface thereof to face the light guide film 713. A first height 610-*h* defined by a length between an upper end of the first sidewall 610 and a rear surface of the first horizontal bottom plate 621 is smaller than a second height 630-*h* defined by a length between an upper end of the second sidewall 630 and a rear surface of the second horizontal bottom plate 623.

The reflective film 711 and the cladding film 712 are sequentially disposed on the first horizontal bottom plate 621 and the inclination bottom plate 622 to have a uniform thickness and have a shape corresponding to that of the base chassis 600. The light guide film 713 is disposed on the cladding film 712 and the third surface 713-*c* has a shape corresponding to that of the cladding film 712. The second surface 713-*b* is substantially parallel to the first horizontal bottom plate 621 such that a first thickness 713-h1 at the first surface 713-*a*, i.e., a light incident portion, is thicker than a second thickness 713-h2 at a fourth surface 713-*d*, i.e., an opposite portion, facing the first surface 713-*a*. Thus, the light guide film 713 has a tapered shape in the light incident portion.

As described above, when a portion of the bottom plate 620 is inclined, the light guide film 713 has the tapered shape. Due to the tapered shape, the light guide film 713 has a relatively thin thickness on the first horizontal bottom plate 621 and has a relatively thick thickness on the second horizontal bottom plate 623. In this case, the light exit surface of the light source 510 may be increased to correspond to the first thickness 713-h1. Therefore, when the display apparatus employs the light guide film 713 having the tapered shape, the amount of the light incident into the light guide film 713 from the light source part 500 is increased, and thus the brightness of the display apparatus may be enhanced.

FIG. 4 is a cross-sectional view showing a bottom chassis according to another exemplary embodiment of the invention.

Referring to FIG. 4, a bottom chassis 820 includes a base chassis 600, a reflective film 711, a cladding film 712 and a light guide film 713.

The base chassis 600 includes a bottom surface 620-*a* and a base pattern provided in the bottom surface 620-*a* to have a concavo-convex shape. The base pattern is defined by first recesses 750 recessed from the bottom surface 620-*a* of the bottom plate 620 and spaced apart from each other at a predetermined interval.

The reflective film 711 is disposed on the bottom surface 620-*a* of the base chassis 600 and has a concavo-convex shape corresponding to the base pattern. The reflective film 711 is provided along the base pattern to have a uniform thickness. The reflective film 711 includes second recesses 760 recessed to the base chassis 600, and the second recesses 760 are positioned at positions to respectively correspond to the first recesses 750. Accordingly, the reflective film 711 has the concavo-convex shape corresponding to the base pattern.

The cladding film 712 is disposed on the reflective film 711 and has a concavo-convex pattern corresponding to the base pattern. The cladding film 712 is provided along the concavo-convex shape of the reflective film 711 to have a uniform thickness. The cladding film 712 includes third recesses 770 recessed to the reflective film 711, and the third recesses 770 are positioned at positions to respectively correspond to the second recesses 760. Accordingly, the cladding film 712 has the concavo-convex shape corresponding to the base pattern.

The light guide film 713 is disposed on the cladding film 712 and includes a light guide pattern having a shape corresponding to the base pattern. The light guide film 713 includes a second surface 713-*b* from which the light exits and a third surface 713-*c* making contact with the cladding film 712. The second surface 713-*b* is provided to be substantially parallel to the bottom surface 620-*a* and the third surface 713-*c* includes the light guide pattern. The light guide pattern has a shape corresponding to the concavo-convex shape of the cladding film 712 and includes pattern protrusions 780 protruded from the third surface 713-*c* to the cladding film 712. The pattern protrusions 780 are engaged with the third recesses 770 and have the shape corresponding to that of the third recesses 770. Therefore, the pattern protrusions 780 form the light guide pattern corresponding to the base pattern.

As described above, the first, second, and third recesses 750, 760, and 770 and the pattern protrusions 780 have the shape corresponding to that of the base pattern. The light incident into the light guide film 713 through the first surface 713-*a* is guided by the light guide pattern of the third surface 713-*c* and exits through the second surface 713-*b*. In detail, the light incident to the first surface 713-*a* is guided along the light guide film 713 and reflected, refracted, or scattered by the pattern protrusions 780, and thus the light exits through the second surface 713-*b* in a plane light shape. Accordingly, the bottom chassis 820 may provide the plane light to the optical member 400.

Figure 5:
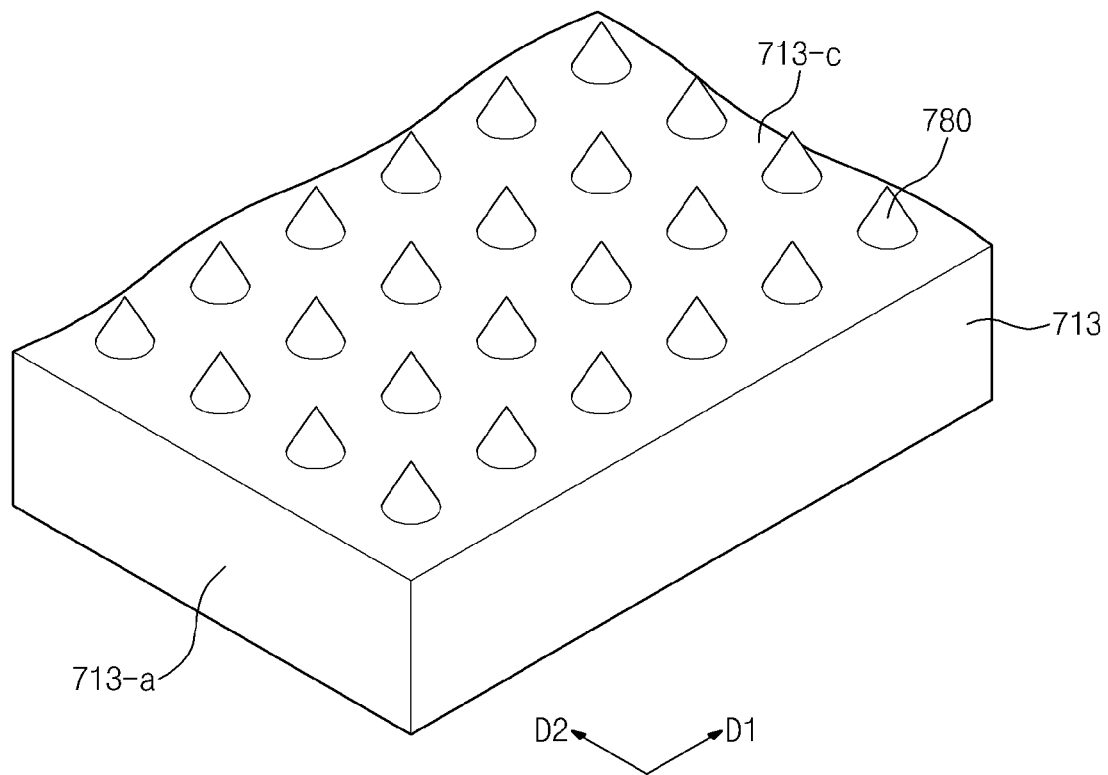
FIG. 5 is a perspective view showing to an exemplary embodiment of a light guide film according the invention.
Figure 6:
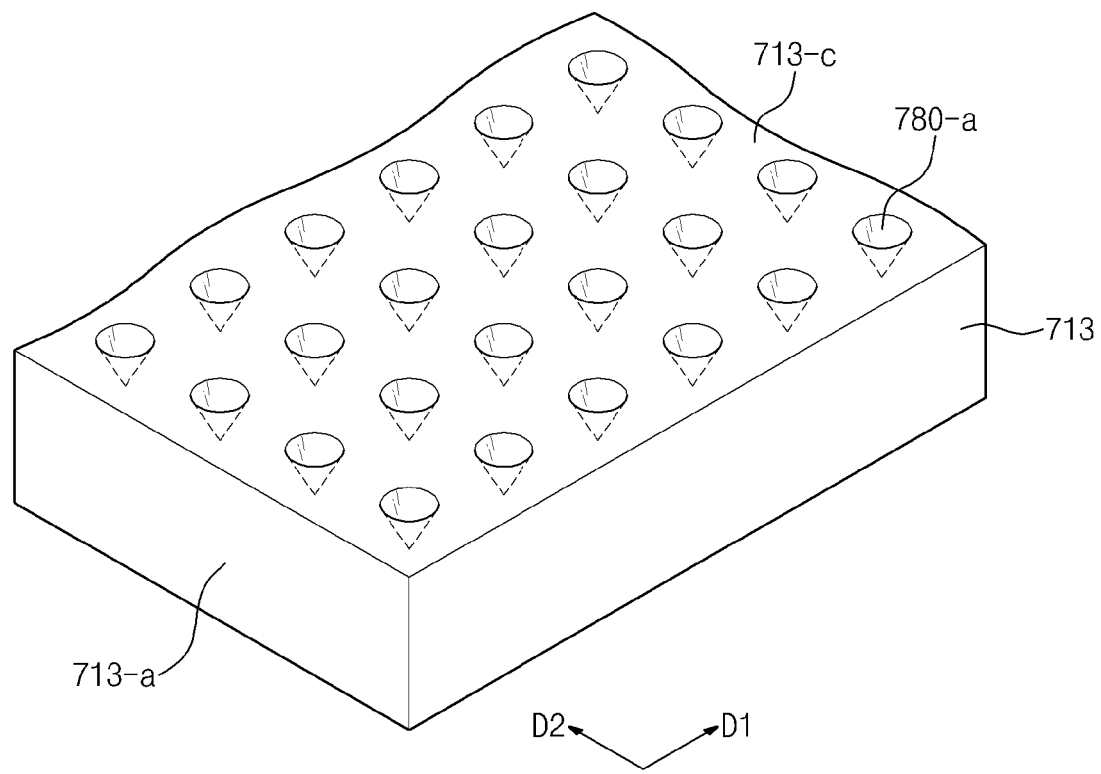
FIG. 6 is a perspective view showing another exemplary embodiment of a light guide film according to the invention.
Figure 7:
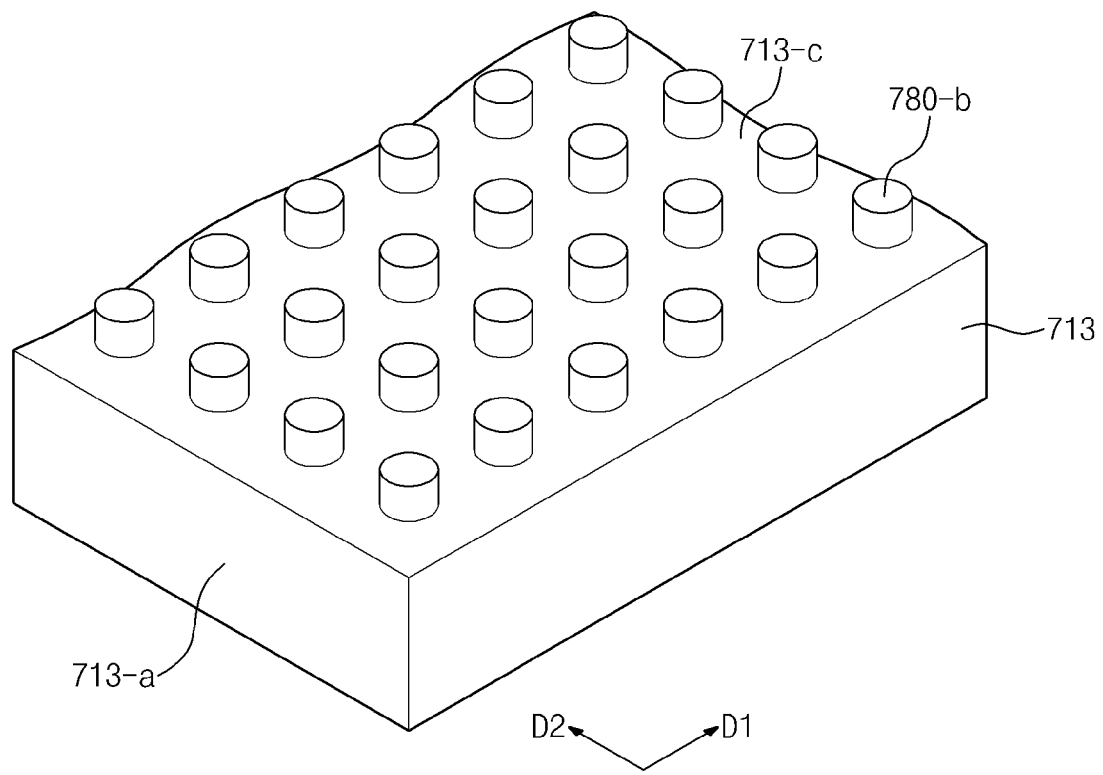
FIG. 7 is a perspective view showing another exemplary embodiment of a light guide film according to the invention.
Figure 8:
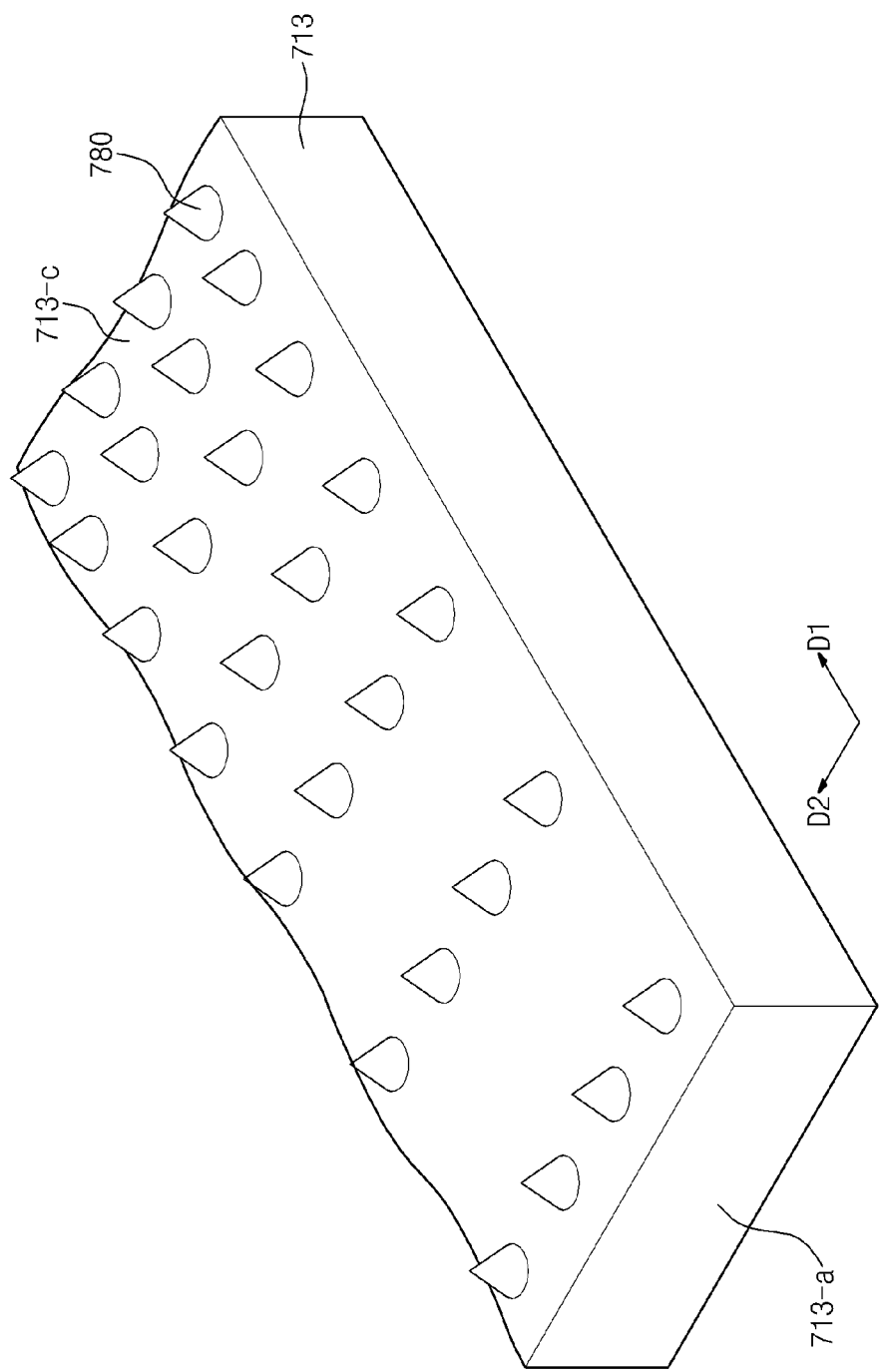
FIG. 8 is a perspective view showing another exemplary embodiment of a light guide film according to the invention.

FIG. 5 is a perspective view showing a light guide film according to an exemplary embodiment of the invention, FIG. 6 is a perspective view showing a light guide film according to another exemplary embodiment of the invention, FIG. 7 is a perspective view showing a light guide film according to another exemplary embodiment of the invention, and FIG. 8 is a perspective view showing a light guide film according to another exemplary embodiment of the invention. FIGS. 6 to 8 show various light guide patterns disposed on the third surface 713-*c* of the light guide film 713.

A light guide pattern guides the light provided from the light source part 500 to allow the plane light to exit through the second surface 713-*b* of the light guide film 713. In detail, the light guide pattern includes the pattern protrusions 780 to reflect, refract, or scatter the light incident through the first surface 713-*a* to the second surface 713-*b*. As a result, the light, which is reflected, refracted, or scattered to the second surface 713-*b*, is incident to the second surface 713-*b* at an angle smaller than the critical angle and exits through the second surface 713-*b* without being totally reflected.

The pattern protrusions 780 of the light guide pattern may have various shapes in order to travel the light toward the second surface 713-*b*. In an exemplary embodiment, referring to FIG. 5, the third surface 713-*c* includes the light guide pattern configured to include the pattern protrusions 780. Each pattern protrusion 780 has a cone shape, but it should not be limited to the cone shape. In another exemplary embodiment, the light guide pattern may be a pattern recess 780-*a* recessed from the third surface 713-*c* to the second surface 713-*b* to have the cone shape as shown in FIG. 6. In addition, in another exemplary embodiment, the light guide pattern may be a pattern protrusion 780-*b* having a cylinder shape as shown in FIG. 7. Further, in other exemplary embodiments, the pattern protrusion 780 may have various types of shapes such as an elliptical cone shape, a triangular pyramid shape, a quadrangular pyramid shape, a hexagonal pyramid shape, an elliptic cylinder shape, a triangular prism shape, a square column shape, or a hexagonal column shape, for example.

Referring to FIG. 5, the pattern protrusions 780 are arranged on the third surface 713-*c* in a two-dimensional matrix form. In detail, the pattern protrusions 780 are spaced apart from each other at a predetermined distance in a square array along the first and second directions D1 and D2, but they should not be limited thereto or thereby. In an exemplary embodiment, the distance between the pattern protrusions 780 becomes narrow along the first direction D1 as shown in FIG. 8 in order to provide the uniform plane light to the second surface 713-*b*. In addition, according to another exemplary embodiment, the pattern protrusions 780 are configured to include grooves each having a line shape.

FIGS. 9A to 9D are views showing a method of manufacturing a bottom chassis according to an exemplary embodiment of the invention.

Referring to FIGS. 9A to 9D, the method of manufacturing the bottom chassis 800 includes forming the base chassis 600, forming the reflective film 711, forming the cladding film 712 and forming the light guide film 713.

FIG. 9A shows the forming of the base chassis 600. Referring to FIG. 9A, the base chassis 600 is provided to include the bottom plate 620 and the first and second sidewalls 610 and 630. The base chassis 600 may be provided by a rolling method, a forge welding method, or a casting method. In an exemplary embodiment, the base chassis 600 includes a material having high strength, e.g., aluminum, stainless steel, etc., and the bottom plate 620 has a thickness of about 0.5 millimeters (mm).

FIG. 9B shows the forming of the reflective film 711. Referring to FIG. 9B, the reflective film 711 is provided in a film area GA of the bottom surface 620-a of the base chassis 600. In an exemplary embodiment, the reflective film 711 is provided by laminating a reflective material on the bottom surface 620-a. The reflective material has high reflectance with respect to the light and is provided by using the resin, such as PC or PET. The reflective film 711 has a uniform thickness of about 0.2 mm and an upper surface of the reflective film 711 is substantially parallel to the bottom surface 620-a.

FIG. 9C shows the forming of the cladding film 712. Referring to FIG. 9C, the cladding film 712 is disposed on the reflective film 711 in the film area GA. In an exemplary embodiment, the cladding film 712 is provided by laminating a cladding material disposed (e.g., coated) on the upper surface of the reflective film 711. The cladding material has the refractive index smaller than a refractive index of a guiding material of the light guide film 713. In an exemplary embodiment, the cladding film 712 has a uniform thickness of about 10 micrometers (μm) to about 100 μm and an upper surface of the cladding film 712 is substantially parallel to the bottom surface 620-a.

FIG. 9D shows the forming of the light guide film 713. Referring to FIG. 9D, the light guide film 713 is disposed on the cladding film 712 in the film area GA. In an exemplary embodiment, the light guide film 713 is coated on the upper surface of the cladding film 712 by laminating the guiding material disposed on the upper surface of the cladding film 712. In an exemplary embodiment, the guiding material includes PMMA with high light transmittance and high weather resistance. In an exemplary embodiment, the light guide film 713 has a uniform thickness of about 0.2 mm and an upper surface of the light guide film 713 is substantially parallel to the bottom surface 620-a. In particular, since light converting part 700 including the reflective film 711, the cladding film 712 and the light guide film 713 is directly disposed on the base chassis 600, the thickness of the light guide film 713 may be effectively reduced.

Consequently, a bottom chassis, a reflective plate, and a light guide plate of a conventional liquid crystal display, which are assembled to each other after being separately manufactured, are replaced with the base chassis 600, the reflective film 711, the cladding film 712 and the light guide film 713, which are integrally provided with each other, and thus the manufacturing process of the LCD may be simplified. Therefore, defects occurring when the LCD is assembled may be effectively reduced, the time required to assemble the LCD may be shortened, and a manufacturing cost of the LCD may be effectively reduced. In addition, the thickness of the light guide film 713 is about 50 μm to about 300 μm, and thus the total thickness of the LCD may be effectively reduced.

Figure 10A:
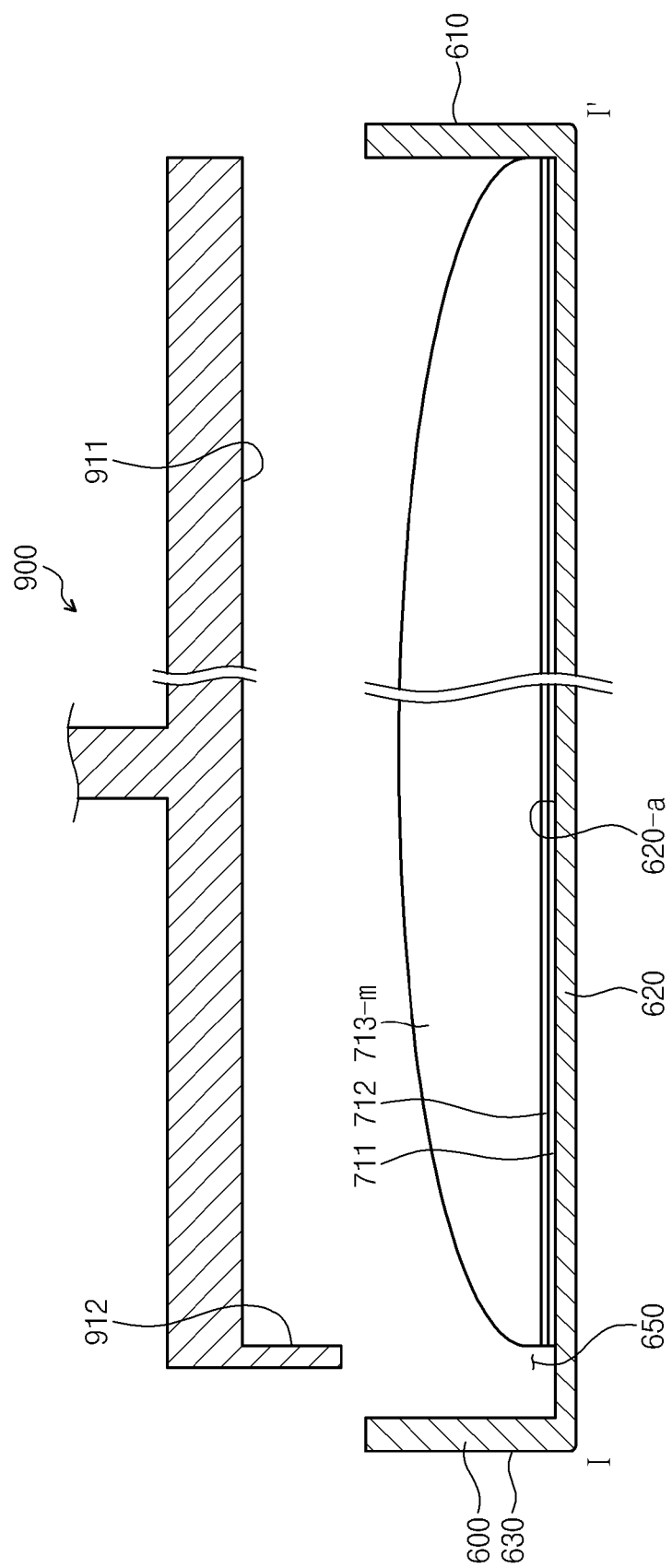
FIGS. 10A and 10B are views showing another exemplary embodiment of a method of manufacturing a light guide film according to the invention.
Figure 10B:
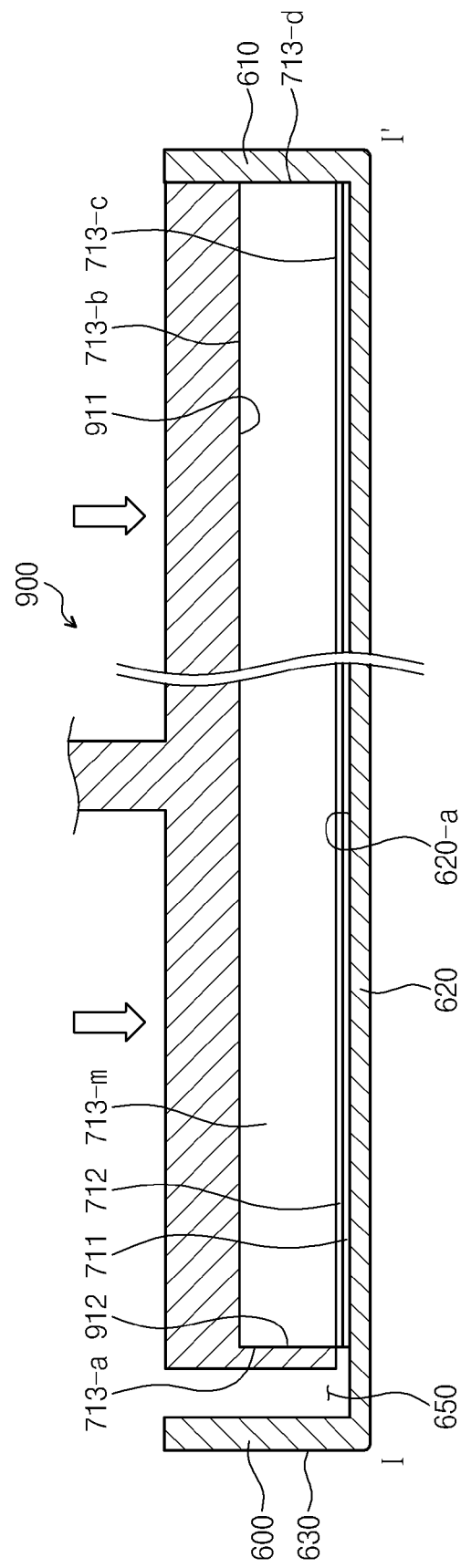

FIGS. 10A and 10B are views showing a method of manufacturing a light guide film according to another exemplary embodiment of the invention. Referring to FIGS. 10A and 10B, the method of manufacturing the light guide film includes providing the guiding material and pressing the guiding material.

FIG. 10A shows the providing of the guiding material. Referring to FIG. 10A, the guiding material 713-m is coated on the cladding film 712. A surface of the coated guiding material 713-m may have a convex shape due to a surface tension. An amount of the guiding material 713-m coated on the cladding film 712 is determined depending on the thickness of the light guide film 713, to be formed. Accordingly, when the amount of the guiding material 713-m is decreased, the thickness of the light guide film 713 becomes thin, and when the amount of the guiding material 713-m is increased, the thickness of the light guide film 713 becomes thick.

FIG. 10B shows the pressing of the guiding material. Referring to FIG. 10B, the coated guiding material 713-m is injection-molded by an injection mold 900. The injection mold 900 is disposed on the coated guiding material 713-m and descended to the guiding material 713-m to press the guiding material 713-m. The injection mold 900 includes a first molding surface 911 and a second molding surface 912 to mold the guiding material 713-m into the light guiding film 713. When the injection mold 900 is descended, the first molding surface 911 presses the upper portion of the guiding material 713-m to the bottom surface 620-a. The second molding surface 912 effectively prevents the guiding material 713-m from moving to the second sidewall 630 while the first molding surface 911 presses the guiding material 713-m. Accordingly, a space is defined between the second sidewall 630 of the bottom chassis 600 and the light guide film 713, and the space serves as the light source receiving part 650 in which the light source part 500 is accommodated.

Therefore, the first molding surface 911 molds the second surface 713-b of the light guide film 713. That is, when the first molding surface 911 is substantially parallel to the bottom surface 620-a, the second surface 713-b may be provided to be substantially parallel to the bottom surface 620-a. According to another exemplary embodiment, when a portion of the first molding surface 911, which is adjacent to the second sidewall 630, is provided to be inclined, the light guide film 713 having the tapered shape may be provided. In detail, one end of the first molding surface 911, which is extended toward the second sidewall 630, is inclined to an opposite direction to a direction which the first molding surface 911 faces while being extended toward the second sidewall 630. Accordingly, the third surface 713-c of the light guide film 713 is provided to be substantially parallel to the upper surface of the cladding film 712 and the second surface 713-b of the light guide film 713 is provided to have the shape corresponding to that of the first molding surface 911. Consequently, the light guide film 713 has the tapered shape.

The second molding surface 912 molds the first surface 713-a of the light guide film 713. The third surface 713-c is provided to correspond to the upper surface of the cladding film 712 that makes contact with the third surface 713-c, and thus the third surface 713-c is provided to be substantially parallel to the bottom surface 620-a. The other surfaces of the light guide material 713-m, which include the fourth surface 713-d, are molded by the sidewalls of the base chassis 600 including the first side wall 610, which respectively make contact with the other surfaces.

FIGS. 11A to 11E are views showing a method of manufacturing a bottom chassis according to another exemplary embodiment of the invention.

Referring to FIGS. 11A to 11E, the method of manufacturing the bottom chassis 800 includes forming the base chassis 600, forming the base pattern, forming the reflective film 711, forming the cladding film 712, and forming the light guide film 713. In FIGS. 11A to 11E, the forming of the base chassis 600, the forming of the reflective film 711, the forming of the cladding film 712, and the forming of the light guide film 713 are the same as those shown in FIGS. 9A to 9D, and thus detailed descriptions thereof will be omitted.

Figure 11A:
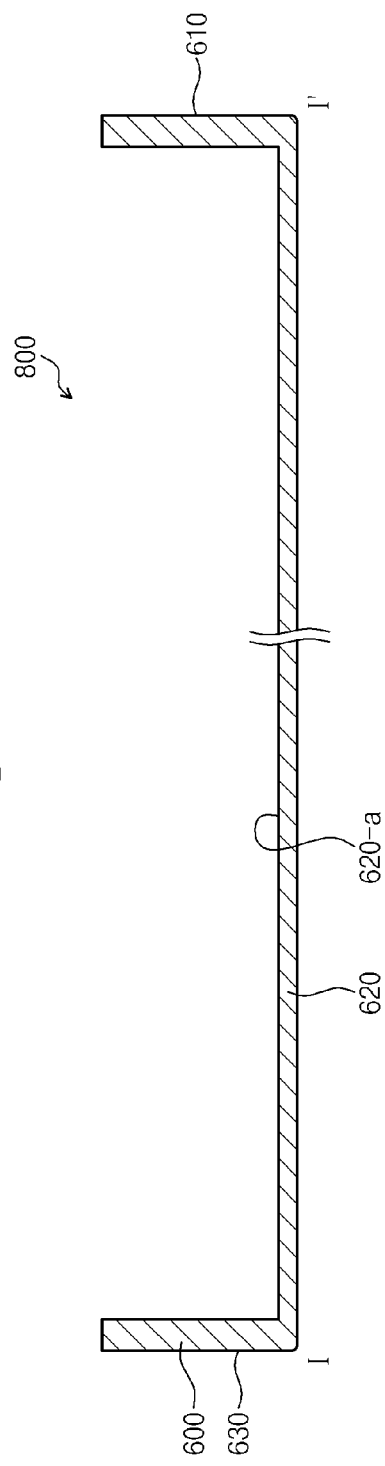

FIG. 11A shows the forming of the base chassis 600. In an exemplary embodiment, the base chassis 600 including the first sidewall 610, the bottom plate 620, and the second sidewall 630 is provided by a forge welding method or a casting method.

Figure 11B:
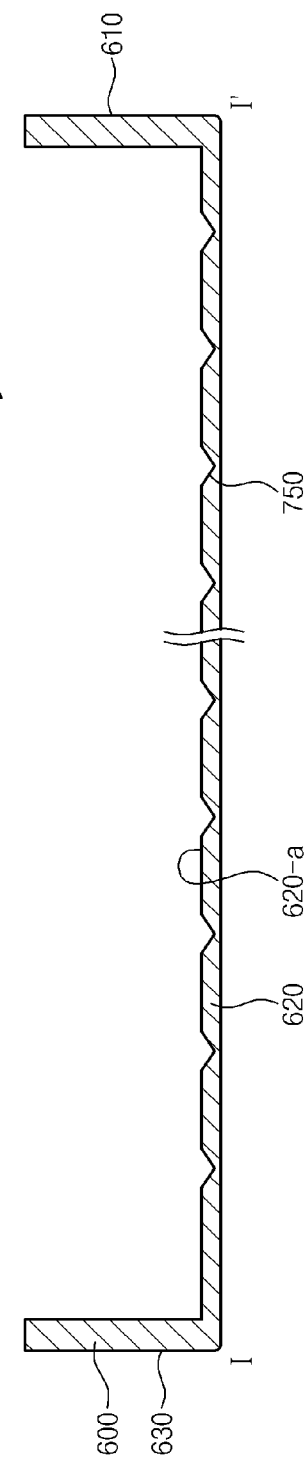

Referring to FIG. 11B, the base pattern having the concavo-convex shape is disposed on the bottom surface 620-*a*. To form the base pattern on the bottom surface 620-*a*, the first recesses 750 are provided by recessing the bottom surface 620-*a* to the rear surface of the bottom plate 620 facing the bottom surface 620-*a*. The first recesses 750 are spaced apart from each other by the predetermined distance.

Referring to FIG. 11C, the reflective film 711 is disposed on the bottom surface 620-*a*. The reflective material is provided in the film area GA to have the uniform thickness. Thus, the second recesses 760 recessed from the reflective film 711 to the bottom surface 620-*a* are provided to respectively correspond to the first recesses 750. The second recesses 760 form the concavo-convex shape corresponding to the base pattern.

Referring to FIG. 11D, the cladding film 712 is disposed on the reflective film 711. The cladding material is provided on the reflective film 711 in the film area GA to have the uniform thickness. Thus, the third recesses 770 recessed from the cladding film 712 to the reflective film 711 are provided to respectively correspond to the second recesses 760. The third recesses 770 form the concavo-convex shape corresponding to the base pattern.

Figure 11E:
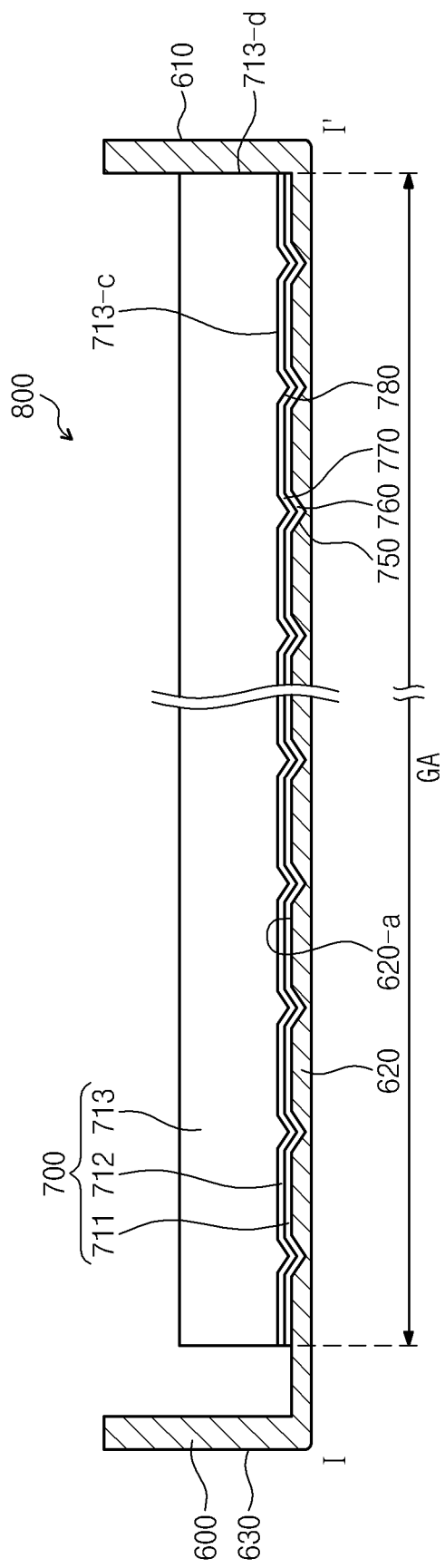

Referring to FIG. 11E, the light guide film 713 is disposed on the cladding film 712 in the film area GA. The guiding material is injection-molded on the cladding film 712 using the injection mold 900 as shown in FIG. 10B. Accordingly, the pattern protrusions 780 are disposed only on the third surface 713-*c*, so that the light guide pattern may be disposed only on the third surface 713-*c* to correspond to the base pattern. However, the method of forming the light guide film 713 should not be limited to the above-mentioned method. In an exemplary embodiment, when the guiding material is laminated on the cladding film 712 at the uniform thickness as shown in FIG. 9D, the light guide pattern may be disposed on the second surface 713-*b* and the third surface 713-*c* to correspond to the base pattern.

Figure 12A:
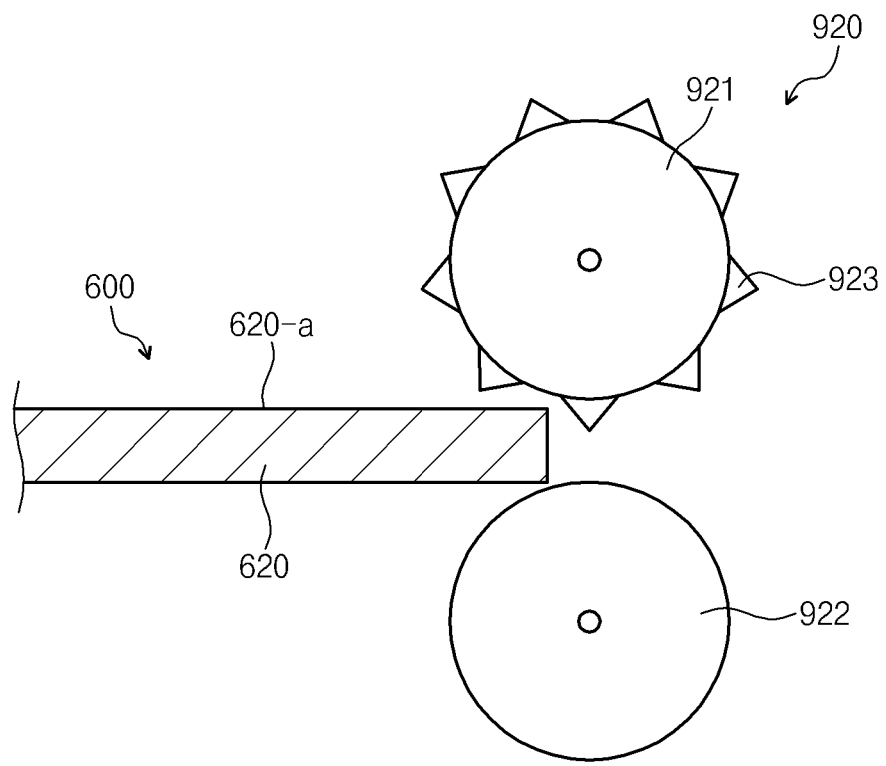
FIGS. 12A and 12B are views showing an exemplary embodiment of a method of forming a base pattern according to the invention.
Figure 12B:
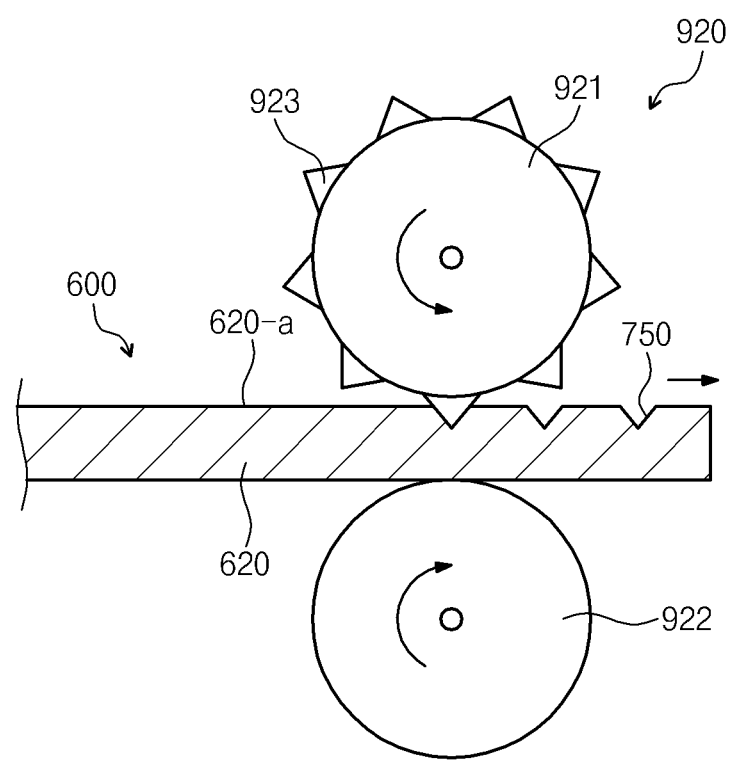

FIGS. 12A and 12B are views showing a method of forming a base pattern according to an exemplary embodiment of the invention. Referring to FIGS. 12A and 12B, the method of forming the base pattern includes aligning the base chassis 600 and forming the pattern. The base pattern is provided by a roll printing apparatus 920. First, the bottom plate 620 is aligned to be disposed between a mold roll 921, on which a protrusion 923 having a reverse shape to the base pattern is formed, and a base roll 922. Then, the mold roll 921 and the base roll 922 are rotated to allow the bottom plate 620 to pass between the mold roll 921 and the base roll 922, and thus the protrusion 923 having the reverse shape to the base pattern presses the bottom surface 620-*a* while the bottom plate 620 passes through between the mold roll 921 and the base roll 923. Thus, the first recesses 750 and the base pattern are provided in the bottom surface 620-*a*.

Figure 13A:
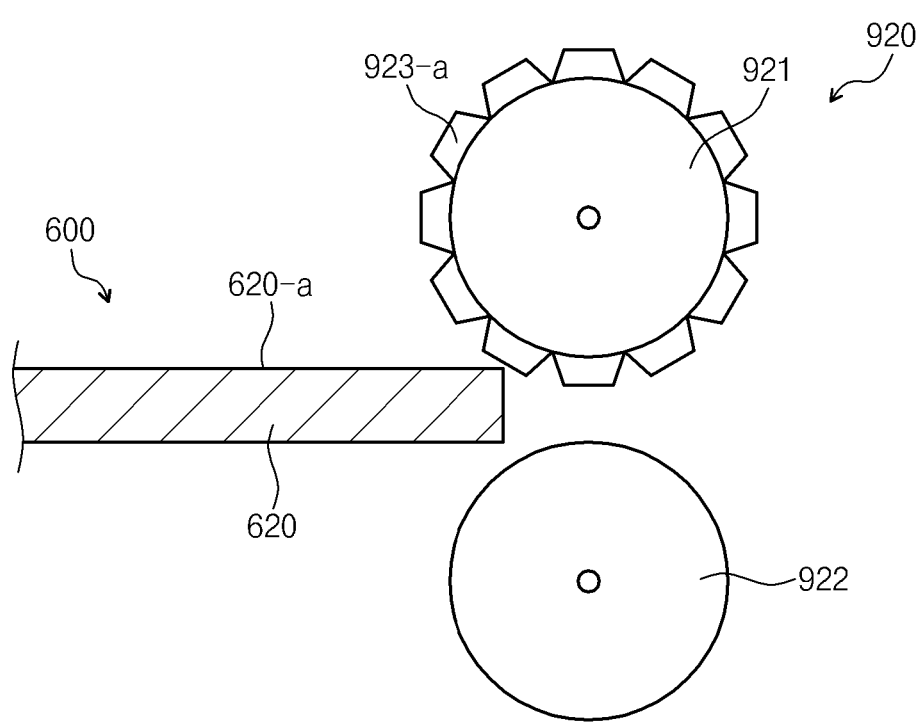
FIGS. 13A and 13B are views showing another exemplary embodiment of a method of forming a base pattern according to the invention.
Figure 13B:
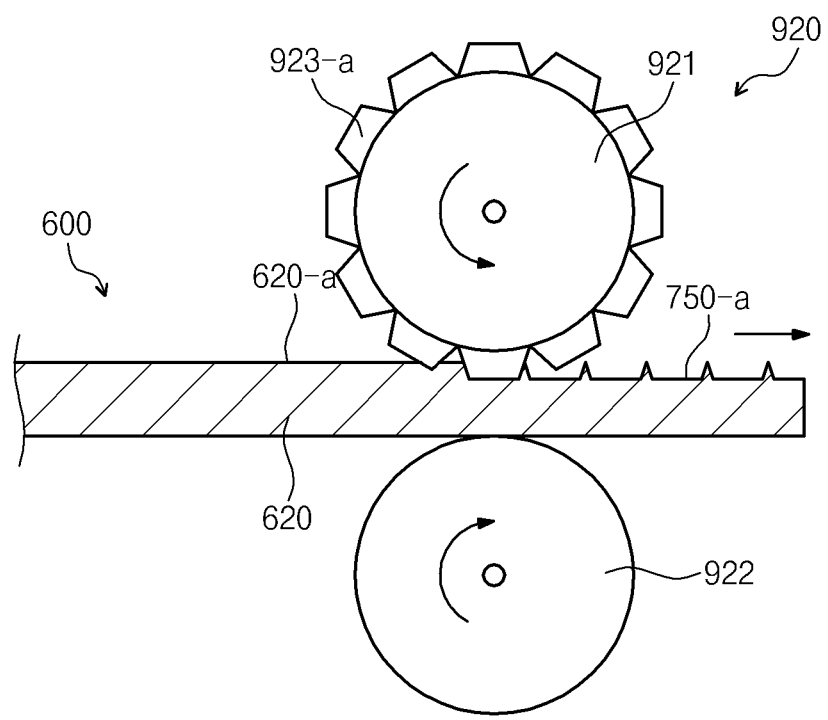

FIGS. 13A and 13B are views showing a method of forming a base pattern according to another exemplary embodiment of the invention.

As shown in FIGS. 13A and 13B, a mold roll 921 includes a protrusion 923-*a* having a reverse shape to the base pattern in order to form a first recesses 750-*a*. Accordingly, the protrusion 923-*a* having the reverse shape to the base pattern presses the bottom surface 620-*a* while the bottom plate 620 passes through between the mold roll 921 and the base roll 922. Thus, the first recesses 750-*a* and the base pattern are disposed on the bottom surface 620-*a*.

Figure 14A:
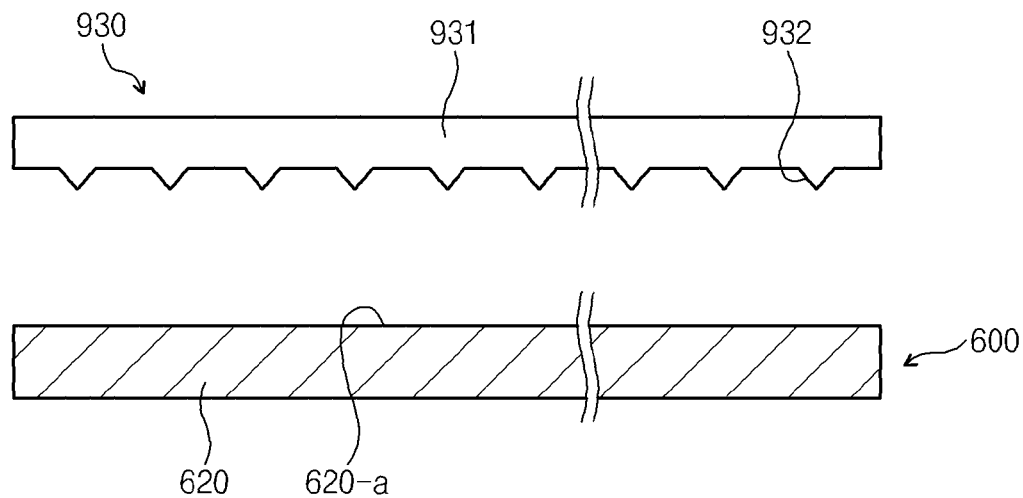
FIGS. 14A to 14C are views showing another exemplary embodiment of a method of forming a base pattern according to the invention.
Figure 14B:
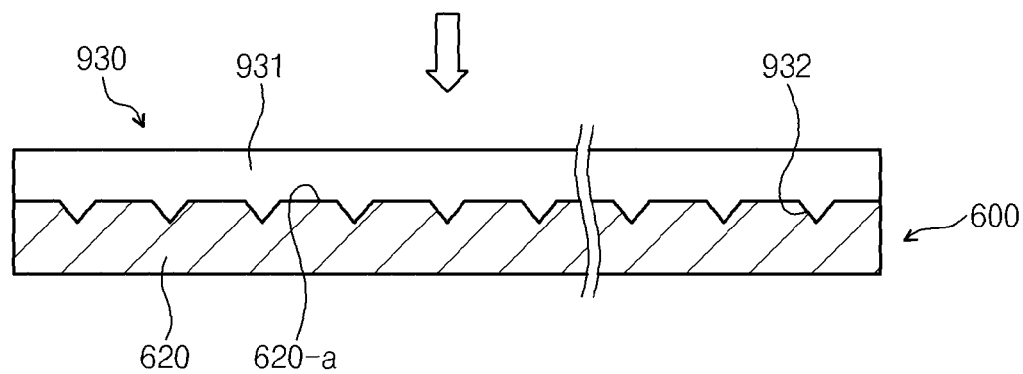
Figure 14C:
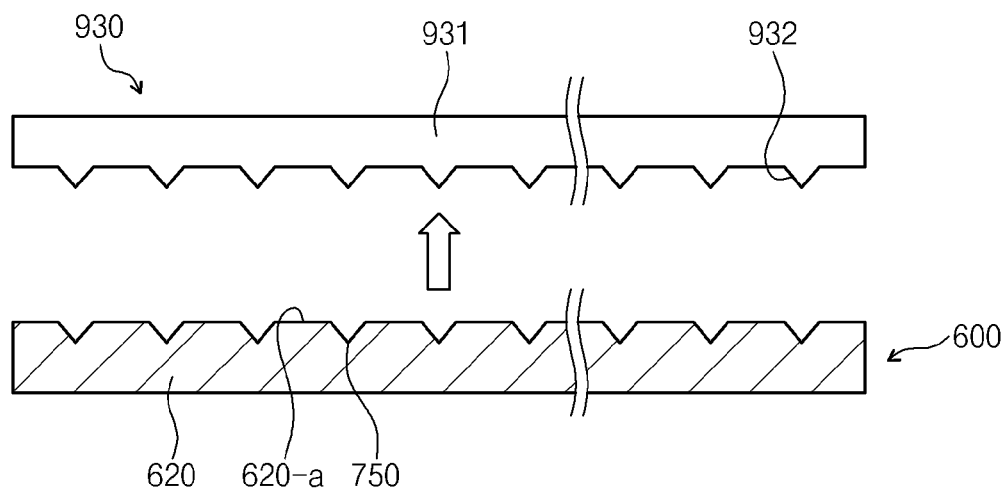

FIGS. 14A to 14C are views showing a method of forming a base pattern according to another exemplary embodiment of the invention. Referring to FIGS. 14A to 14C, the method of forming the base pattern includes aligning the base chassis 600, forming the pattern, and separating an extrusion molding device 930. The base pattern is provided by the extrusion molding device 930. In the aligning of the base chassis 600, the bottom plate 620 of the base chassis 600 is aligned with an extrusion mold 931 having a reverse shape 932 to the base pattern. In the forming of the pattern, the extrusion mold 931 is descended to the base chassis 600 to allow the reverse shape 932 to make contact with the bottom plate 620. Then, when a pressure is applied to the extrusion mold 931, the reverse shape 932 to the base pattern is printed on the bottom surface 620-*a*, and thus the first recesses 750 and the base pattern are disposed on the bottom surface 620-*a*. After that, the extrusion mold 931 is ascended to be separate from the base chassis 600.

Figure 15A:
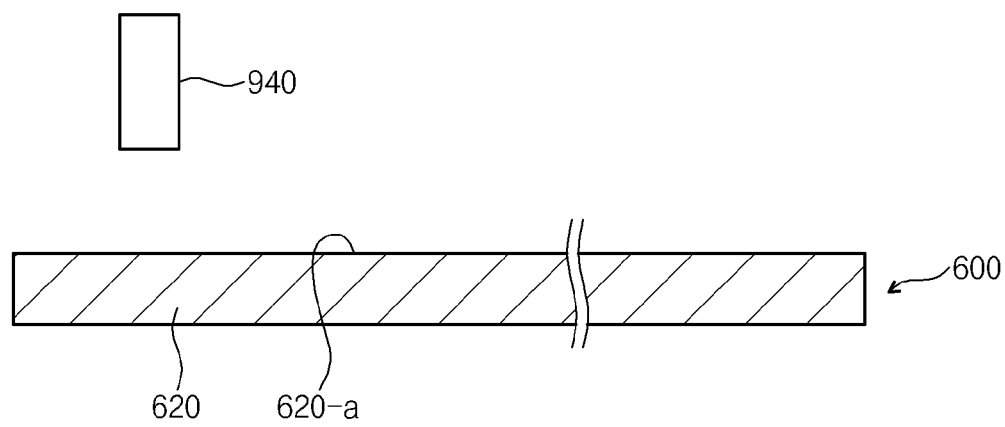
FIGS. 15A and 15B are views showing another exemplary embodiment of a method of forming a base pattern according to the invention.
Figure 15B:
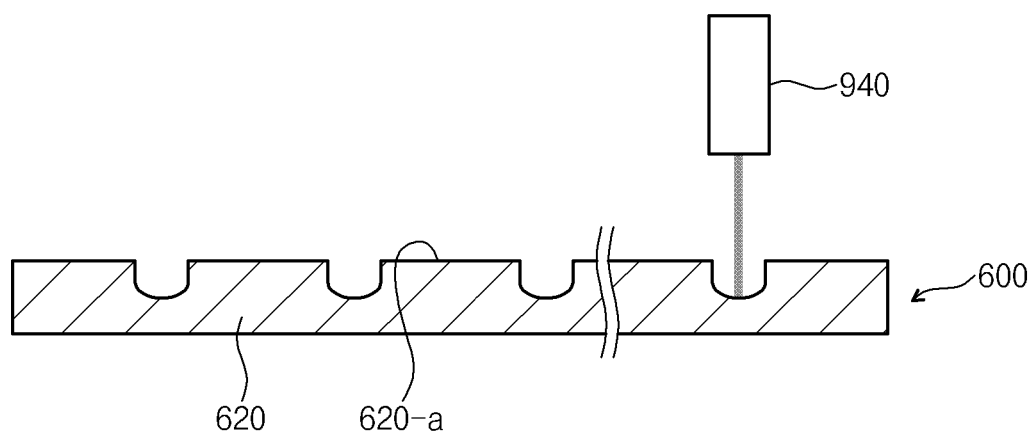

FIGS. 15A and 15B are views showing a method of forming a base pattern according to another exemplary embodiment of the invention. Referring to FIGS. 15A and 15B, the method of forming the base pattern includes aligning a laser unit 940 and forming a pattern. The base pattern is provided by the laser unit 940. In the aligning of the laser unit 940, the laser unit 940 is aligned on the base chassis 600 to correspond to the base pattern. In the forming of the pattern, a laser beam is irradiated onto the bottom surface 620-*a* using the laser unit 940 to partially recess the bottom surface 620-*a*, and thus the base pattern is formed.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A bottom chassis comprising:
   a base chassis which accommodates a light source part which emits a light;
   a reflective film which is disposed on a bottom plate of the base chassis and includes a reflective material to reflect the light;
   a cladding film disposed on the reflective film; and
   a light guide film which is disposed on the cladding film, receives the light from the light source part through a first surface thereof, and guides the received light to exit through a second surface thereof as a plane light,
   wherein the cladding film has a refractive index smaller than a refractive index of the light guide film, wherein the bottom plate of the base chassis comprises a base pattern having a concavo-convex shape consisting of a plurality of concavities and a plurality of convexities defined in a bottom surface of the bottom plate of the base chassis which contacts the reflective film, and wherein an opposing surface of the bottom plate of the base chassis which is opposite to the bottom surface is flat.

2. The bottom chassis of claim 1, wherein the light guide film comprises a light guide pattern disposed on a third surface facing the second surface to guide the received light to the second surface, and the first surface connects the second surface and the third surface.

3. The bottom chassis of claim 2, wherein the light guide pattern has a shape corresponding to the base pattern.

4. The bottom chassis of claim 3, wherein the reflective film and the cladding film are sequentially stacked on the bottom plate, and each of the reflective film and the cladding film has the concavo-convex shape corresponding to the base pattern on the bottom plate and a uniform thickness.

5. The bottom chassis of claim 4, wherein the light guide pattern comprises a pattern recess recessed from the third surface to the second surface and the pattern recess has a cone shape, an elliptical cone shape, a triangular pyramid shape, a quadrangular pyramid shape, a hexagonal pyramid shape, a cylinder shape, an elliptic cylinder shape, a triangular prism shape, a square column shape, or a hexagonal column shape.

6. The bottom chassis of claim 4, wherein the light guide pattern comprises a pattern protrusion protruded from the third surface to the cladding film and the pattern protrusion has a cone shape, an elliptical cone shape, a triangular pyramid shape, a quadrangular pyramid shape, a hexagonal pyramid shape, a cylinder shape, an elliptic cylinder shape, a triangular prism shape, a square column shape, or a hexagonal column shape.

7. The bottom chassis of claim 1, wherein the light guide film has a thickness of about 50 micrometers to about 300 micrometers.

8. The bottom chassis of claim 1, wherein the cladding film has a thickness of about 10 micrometers to about 100 micrometers.

9. The bottom chassis of claim 1, wherein the cladding film comprises silicon.

10. The bottom chassis of claim 1, further comprising a first sidewall and a second sidewall, wherein the bottom plate comprises a first horizontal bottom plate, a second horizontal bottom plate, and an inclination bottom plate disposed between the first and second horizontal bottom plates, the inclination bottom plate is extended from an end of the first horizontal bottom plate to an end of the second horizontal bottom plate and inclined to a rear surface of the first horizontal bottom plate, the first sidewall is extended from the other end of the first horizontal bottom plate, the second sidewall is extended from the other end of the second horizontal bottom plate to face the first sidewall, and the light source part is disposed on the second horizontal bottom plate.

11. The bottom chassis of claim 10, wherein the reflective film and the cladding film are disposed on the first and second horizontal bottom plates and the inclination bottom plate and have a uniform thickness, respectively, and a width of the first surface of the light guide film in a direction vertical to the bottom plate is greater than a width of a fourth surface facing the first surface.

12. A method of manufacturing a bottom chassis, the method comprising:

forming a base chassis;

providing a reflective material on a bottom surface of the base chassis to form a reflective film;

providing a cladding material on an upper surface of the reflective film to form a cladding film; and providing a guiding material on an upper surface of the cladding film to form a light guide film, wherein the cladding material has a refractive index smaller than a refractive index of the guiding material, wherein the forming the base chassis comprises forming a base pattern having a concavo-convex shape consisting of a plurality of concavities and a plurality of convexities defined in the bottom surface which contacts the reflective film, and wherein an opposing surface of the bottom plate of the base chassis which is opposite to the bottom surface is flat.

13. The method of claim 12, wherein the forming the reflective film comprises providing the reflective material on the base pattern at a uniform thickness such that the reflective film has the concavo-convex shape corresponding to the base pattern, the forming the cladding film comprises providing the cladding material on the concavo-convex shape of the reflective film at a uniform thickness such that the cladding film has the concavo-convex shape corresponding to the concavo-convex shape of the reflective film, and the forming the light guide film comprises forming a light guide pattern corresponding to the concavo-convex shape on a surface thereof which contacts with the cladding film.

14. The method of claim 13, wherein the forming the base pattern comprises:

aligning a laser unit along the base pattern; and irradiating a laser beam on an upper surface of the base chassis using the laser unit to form the base pattern on the bottom surface of the base chassis.

15. The method of claim 13, wherein the forming the base pattern comprises:

aligning an extrusion mold having a reverse shape to the base pattern on the base chassis;

applying a pressure onto the extrusion mold to form the base pattern on the bottom surface of the base chassis; and separating the extrusion mold from the base chassis.

16. The method of claim 13, wherein the forming the base pattern comprises:

interposing the base chassis between a mold roll having a reverse shape to the base pattern and a base roll; and rotating the mold roll and the base roll to form the base pattern on the bottom surface of the base chassis.

17. The method of claim 12, wherein the light guide film is provided by injection-molding the guiding material using an injection mold.

18. A display apparatus comprising:

a light source part which emits a light;

a bottom chassis which receives the light from the light source part, converts the light to a plane light and comprises:

a base chassis which accommodates the light source part;

a reflective film disposed on a bottom plate of the base chassis and including a reflective material to reflect the light;

a cladding film disposed on the reflective film; and a light guide film which is disposed on the cladding film, receives the light from the light source part through a first surface thereof, and guides the received light to exit through a second surface thereof, and a display panel which is disposed on the light guide film, receives the plane light from the bottom chassis and transmits the plane light based on an image data to display an image, wherein the cladding film has a refractive index smaller than a refractive index of the light guide film, wherein the cladding film is interposed between the reflective film and the display panel, and wherein the light guide film is interposed between the display panel and the cladding film, and wherein the cladding film comprises a cladding pattern having a first concavo-convex shape.

19. The display apparatus of claim 18, wherein the light guide film comprises a light guide pattern disposed on a third surface facing the second surface to guide the received light to the second surface, and the first surface connects the second surface and the third surface.

20. The display apparatus of claim 19, wherein the light guide pattern has a shape corresponding to the base pattern.

21. The display apparatus of claim 18, wherein the bottom plate of the base chassis comprises a base pattern having a second concavo-convex shape, and wherein the first and second concavo-convex shapes have substantially same shape.

22. The display apparatus of claim 18, wherein the first concavo-convex shape includes a plurality of recesses defined at a upper surface of the cladding film, each of the plurality of recesses is recessed towards the reflective film.

* * * * *